(12) United States Patent
Dinter et al.

(10) Patent No.: US 9,151,275 B2
(45) Date of Patent: Oct. 6, 2015

(54) DRIVE SYSTEM FOR A WIND TURBINE

(75) Inventors: Ralf Martin Dinter, Gelsenkirchen (DE); Arno Klein-Hitpass, Aachen (DE); Jan-Dirk Reimers, Aachen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 590 days.

(21) Appl. No.: 13/438,487

(22) Filed: Apr. 3, 2012

(65) Prior Publication Data

US 2013/0095972 A1 Apr. 18, 2013

(30) Foreign Application Priority Data

Apr. 4, 2011 (EP) ..................................... 11002782
Jul. 21, 2011 (EP) ..................................... 11174846

(51) Int. Cl.
*F16H 1/28* (2006.01)
*F03D 11/02* (2006.01)
*F16H 1/46* (2006.01)

(52) U.S. Cl.
CPC *F03D 11/02* (2013.01); *F16H 1/28* (2013.01); *F05B 2260/301* (2013.01); *F05B 2260/40311* (2013.01); *F05B 2260/96* (2013.01); *F05C 2225/00* (2013.01); *F05C 2251/02* (2013.01); *F16H 1/46* (2013.01); *Y02E 10/722* (2013.01)

(58) Field of Classification Search
CPC ....... F16H 1/28; F16H 1/46; F16H 2001/289; F16H 2057/02078; F16H 57/021; B60K 2016/006
See application file for complete search history.

(56) References Cited

U.S. PATENT DOCUMENTS

| 8,128,525 | B2 | 3/2012 | Dinter et al. | |
|---|---|---|---|---|
| 2010/0133854 | A1 | 6/2010 | Jansen et al. | |
| 2010/0329867 | A1* | 12/2010 | Patel et al. | ................ 416/169 R |
| 2011/1068645 | | 3/2011 | Pötter et al. | |

FOREIGN PATENT DOCUMENTS

| CN | 101363407 A | 2/2009 |
|---|---|---|
| CN | 101865084 A | 10/2010 |
| CN | 101936265 A | 1/2011 |
| DE | 29609794 U1 | 8/1996 |
| EP | 1243791 A2 | 9/2002 |
| EP | 1717489 A2 | 11/2006 |
| EP | 1544504 A3 | 6/2007 |
| EP | 2031273 A2 | 3/2009 |

(Continued)

*Primary Examiner* — Huan Le
(74) *Attorney, Agent, or Firm* — Henry M. Feiereisen LLC

(57) ABSTRACT

A drive system has a transmission unit with planetary gear stage and a first shaft associated with a planetary carrier and having a coupling flange connectable to a machine or rotor shaft. The transmission unit and a motor/generator unit includes a rotor connected with a rotation-lock to a hollow rotor shaft which is connected to a second shaft of the transmission unit and enclosed by a gearbox housing. A coupling is arranged radially between the second shaft and the hollow rotor shaft. A gearbox housing support with a hollow cylindrical extension is arranged between the transmission unit and the motor/generator unit. The cylindrical extension concentrically encloses an end section of the second shaft and forms a bearing seat for a bearing arrangement disposed radially between the second shaft and the cylindrical extension. The hollow cylindrical extension is concentrically enclosed by the rotor and the hollow rotor shaft.

31 Claims, 6 Drawing Sheets

(56) References Cited

FOREIGN PATENT DOCUMENTS

| EP | 2216547 A2 | 8/2010 |
| EP | 2 295 147 A1 | 3/2011 |
| EP | 2 372 148 A1 | 10/2011 |
| GB | 2002488 A | 2/1979 |
| GB | 2405455 A | 3/2005 |
| JP | 2009250213 A | 10/2009 |
| WO | WO 2010005790 A2 | 1/2010 |

* cited by examiner

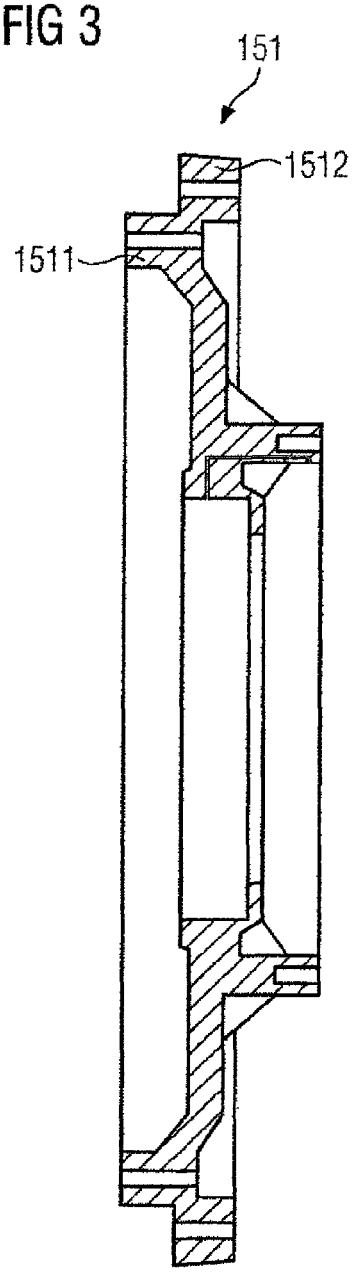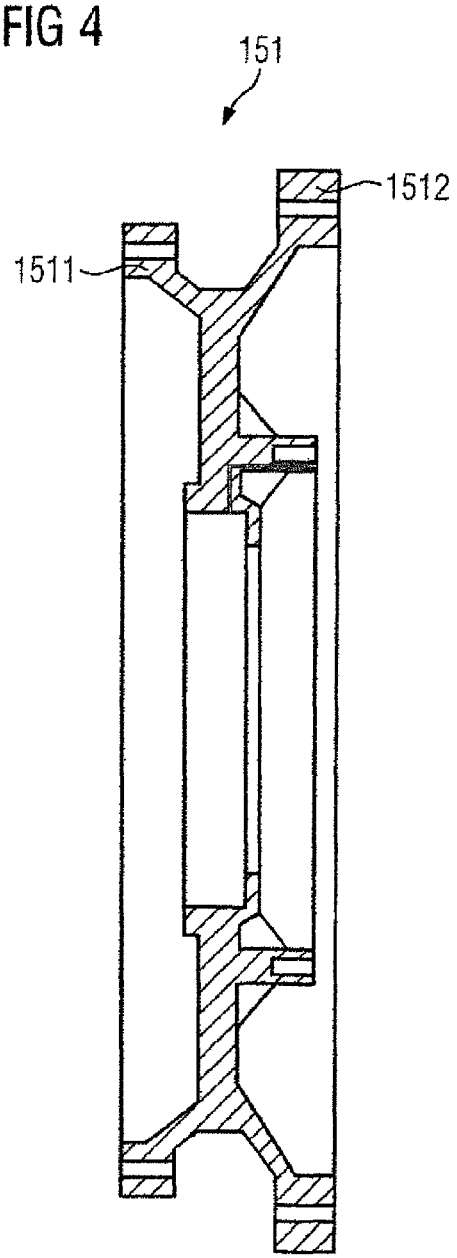

DRIVE SYSTEM FOR A WIND TURBINE

CROSS-REFERENCES TO RELATED APPLICATIONS

This application claims the priority of European Patent Applications Serial No. EP11002782, filed Apr. 4, 2011, and Serial No. EP11174846, filed Jul. 21, 2011, pursuant to 35 U.S.C. 119(a)-(d), the content of which is incorporated herein by reference in its entirety as if fully set forth herein.

BACKGROUND OF THE INVENTION

The present invention relates to a drive system for a wind turbine, and more particularly to a drive system for a wind turbine that can be easily assembled and disassembled.

It would be desirable and advantageous to obviate prior art shortcomings by providing a compact and easy-to-assemble/-install drive system for a wind turbine, and in particular a drive system with a bearing arrangement that is accessible for maintenance or assembly and allows installation activities without the need to dismantle the rotor or the motor or generator unit.

SUMMARY OF THE INVENTION

According to one aspect of the present invention, a drive system according to the invention has a transmission unit with at least one planetary gear stage which has a ring gear, a plurality of planetary gears, a planetary carrier and a sun gear. Also provided is a first shaft which is associated with the transmission unit and has a coupling flange that can be connected to a work machine shaft or rotor shaft, and which is mounted with the planetary carrier. The transmission unit and a motor or generator unit connected to a second shaft of the transmission unit are enclosed by a gearbox housing. The motor or generator unit additionally includes a rotor connected in a rotatably fixed manner to a hollow rotor shaft.

A coupling or clamping connection is arranged radially between the second shaft of the transmission unit and the hollow rotor shaft. Also provided is a gearbox housing support which has a hollow cylindrical extension and is arranged between transmission unit and motor or generator unit. The hollow cylindrical extension concentrically encloses a motor-side or generator-side end section of the second shaft of the transmission unit and forms a bearing seat for a bearing arrangement disposed radially between the second shaft and the hollow cylindrical extension. The hollow cylindrical extension is in turn concentrically enclosed by rotor and hollow rotor shaft. Furthermore, at least one outer bearing element of the bearing arrangement is connected to the hollow cylindrical extension. Both the second shaft of the transmission unit and the hollow rotor shaft are supported by the bearing arrangement. As a result, the drive system according to the invention has a short footprint. Moreover, when the coupling or clamping connection is disassembled, the bearing arrangement is accessible for maintenance or assembly and installation activities without the need to dismantle the rotor or the motor or generator unit.

According to an advantageous development of the present invention, an end section of the second shaft of the transmission unit on the motor or generator side is concentrically enclosed by a hollow gearbox shaft and connected to the latter in a rotatably fixed manner. In this case at least one inner bearing element of the bearing arrangement is provided which is connected to the hollow gearbox shaft instead of to the second shaft.

The hollow rotor shaft and the second shaft of the transmission unit are preferably mounted to the gearbox housing support solely by means of the bearing arrangement. This permits a particularly compact and maintenance-friendly design.

The hollow gearbox shaft can be connected to the second shaft of the transmission unit for example by means of a toothed coupling having involute splines or spiral toothing. Alternatively thereto, the hollow gearbox shaft can be connected to the second shaft of the transmission unit by means of an internal clamping set. In this case the internal clamping set comprises for example at least one outer ring and one inner ring which have conical contact surfaces corresponding to one another and can be interlocked with respect to one another by means of a plurality of axially extending clamping bolts. By interlocking the at least one outer ring and the at least one inner ring it is possible, according to a preferred embodiment of the present invention, to connect not only the second shaft of the transmission unit and the hollow gearbox shaft but also the hollow gearbox shaft and the hollow rotor shaft to one another. This results in an improvement in terms of ease of assembly and installation. Alternatively to a toothed coupling or an internal clamping set, the hollow gearbox shaft can be connected to the second shaft of the transmission unit by means of an external clamping set.

According to an advantageous feature of the present invention, approximately half of the second shaft of the transmission unit may be axially enclosed by the hollow gearbox shaft. The bearing arrangement of the hollow gearbox shaft can then be axially aligned with the center of the rotor of the motor or generator unit.

According to an advantageous feature of the present invention, the gearbox housing support may be integrally formed on a housing intermediate flange arranged between transmission unit and motor or generator unit. The housing intermediate flange may advantageously have a bearing seat for a planetary carrier bearing disposed on the motor or generator side. According to an advantageous feature of the present invention, a stator housing of the motor or generator unit and a ring gear of a motor-side or generator-side planetary gear stage may also be mounted on the housing intermediate flange. Furthermore, the housing intermediate flange may in each case have a flange extension on which the stator housing or the ring gear of the motor- or generator-side planetary gear stage is mounted in each case. Advantageously, both flange extensions may have a stepped diameter, with the diameters having a comparable order of magnitude, the flange extension for the stator housing being the larger of the two. In a design optimized for weight, the flange extension for the ring gear of the motor- or generator-side planetary gear stage may be aligned internally and bolted against the housing intermediate flange. According to another feature of the present invention, the flange extension associated with the stator housing and the flange extension associated with the ring gear may spaced apart axially from one another.

According to yet another advantageous feature of the present invention, the coupling flange may be elastically connected to the work machine shaft or rotor shaft. In this way, a cardanic coupling of a work machine or rotor shaft is possible, in particular with an angular offset. Such a coupling can be implemented, for example, with elastic bolts. Furthermore, the gearbox housing may advantageously also have a circumferentially symmetric or partially symmetric cardanic suspension for connection to a supporting structural element of the wind turbine. The supporting structural element may, for example, be a foundation bearing having a connection to a frame or a nacelle of the wind turbine. Factors damaging to bearings or gear teeth can be avoided by means of a double- or fully-cardanic suspension of the drive system inside the supporting structural element and by a cardanic connection of the coupling flange. Displacements occurring in foundation bearings due to deformations of the main frame of a wind turbine and, according to prior art solutions, being coupled into a drive train by way of a suspension arrangement of said drive train therefore do not cause undesirable reactive forces, but are prevented by the cardanic suspension. Accordingly, the drive system is exposed only to torsional stresses.

When the drive system according to the invention is used in a wind turbine, the transmission unit may be connected to a generator unit. Furthermore, the first shaft of the transmission unit is in this case a drive shaft on the gearbox side. The second shaft of the transmission unit, on the other hand, is an output shaft on the gearbox side. The coupling flange of the gearbox-side drive shaft can be connected to a rotor shaft when the inventive drive system is used in a wind turbine.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 shows a sectional view of a first variant of a housing intermediate flange between transmission and generator unit;

FIG. 4 shows a sectional view of a second variant of a housing intermediate flange between transmission and generator unit;

DETAILED DESCRIPTION OF PREFERRED EMBODIMENTS

Figure 1:
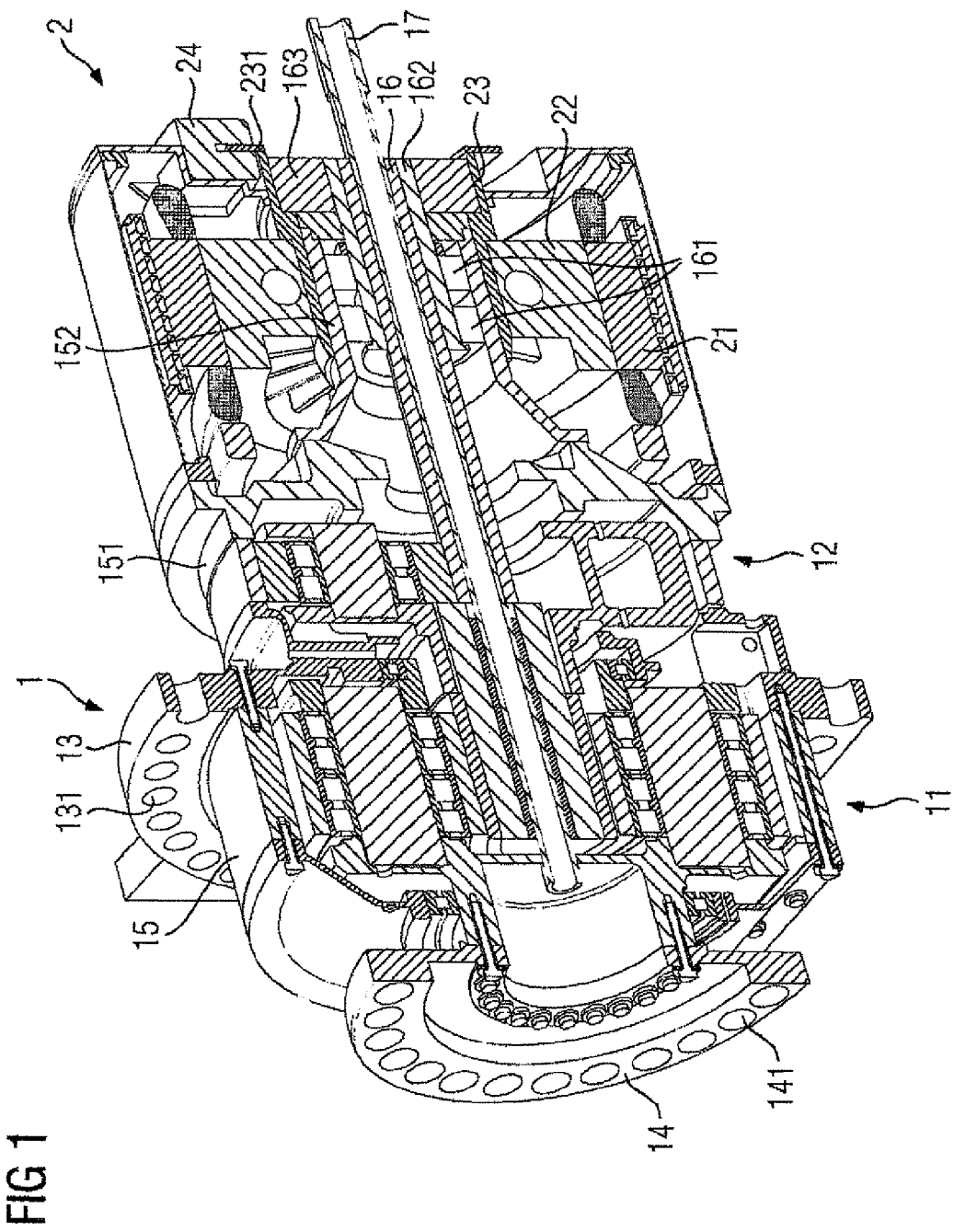
FIG. 1 shows a perspective sectional view of a drive system according to the present invention for a wind turbine.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a drive system for a wind turbine shown with a transmission unit 1 having a first planetary gear stage 11 and a second planetary gear stage 12 in a coaxial arrangement. As can also be construed from the sectional view according to FIG. 2, each planetary gear stage 11, 12 respectively comprises a ring gear 114, 124, a plurality of planetary gears 113, 123, a planetary carrier 112, 122 and a sun gear 111, 121. The transmission unit 1 is connected to a generator unit 2 by way of an output shaft 16 of the transmission unit and is arranged together with said generator unit 2 in a gearbox housing 15. Associated with the transmission unit 1 and integrally molded onto the planetary carrier 112 of the first planetary gear stage 11 is a drive shaft which has a coupling flange 14 that can be connected to a rotor shaft, and which is mounted by way of the planetary carrier 112 of the first planetary gear stage 11. Associated with the planetary carrier 112 of the first planetary gear stage 11 are two bearings 115 and 116 which are arranged between planetary carrier sidewalls and gearbox housing 15 and represent a first and a second main bearing of the transmission unit 1. The planetary carrier 122 of the second planetary gear stage 12 is mounted in a corresponding manner by means of two bearings 125 and 126 arranged between planetary carrier sidewalls and gearbox housing 15.

The generator unit 2 comprises a stator 21 and a rotor 22 connected in a rotatably fixed manner to a hollow rotor shaft 23. A coupling or clamping connection 163 is arranged radially between the output shaft 16 of the transmission unit 1 and the hollow rotor shaft 23. In addition, a gearbox housing support 152 having a hollow cylindrical extension is arranged between transmission unit 1 and generator unit 2. The hollow cylindrical extension concentrically encloses a generator-side end section of the output shaft 16 and forms a bearing seat for a bearing arrangement 161 radially disposed between the output shaft 16 and the hollow cylindrical extension. The hollow cylindrical extension is in turn concentrically enclosed by rotor 22 and hollow rotor shaft 23. In the present exemplary embodiment, two outer bearing elements of the bearing arrangement 161 are connected to the hollow cylindrical extension.

A generator-side end section of the output shaft 16 of the transmission unit 1 is concentrically enclosed by a hollow gearbox shaft 162 and connected to the latter in a rotatably fixed manner. Two inner bearing elements of the bearing arrangement 161 are connected to said hollow gearbox shaft 162. Accordingly, both the output shaft 16 of the transmission unit 1 and the hollow rotor shaft 23 are mounted by means of the bearing arrangement 161. In the present exemplary embodiment, the bearing arrangement 161 disposed in the hollow cylindrical extension of the gearbox housing support 152 is in this case axially aligned centrally onto the rotor 22 of the generator unit 2. Additionally arranged inside the output shaft 16 and the hollow rotor shaft 23 is a pitch tube 17 which extends axially over the entire drive system.

Figure 2:
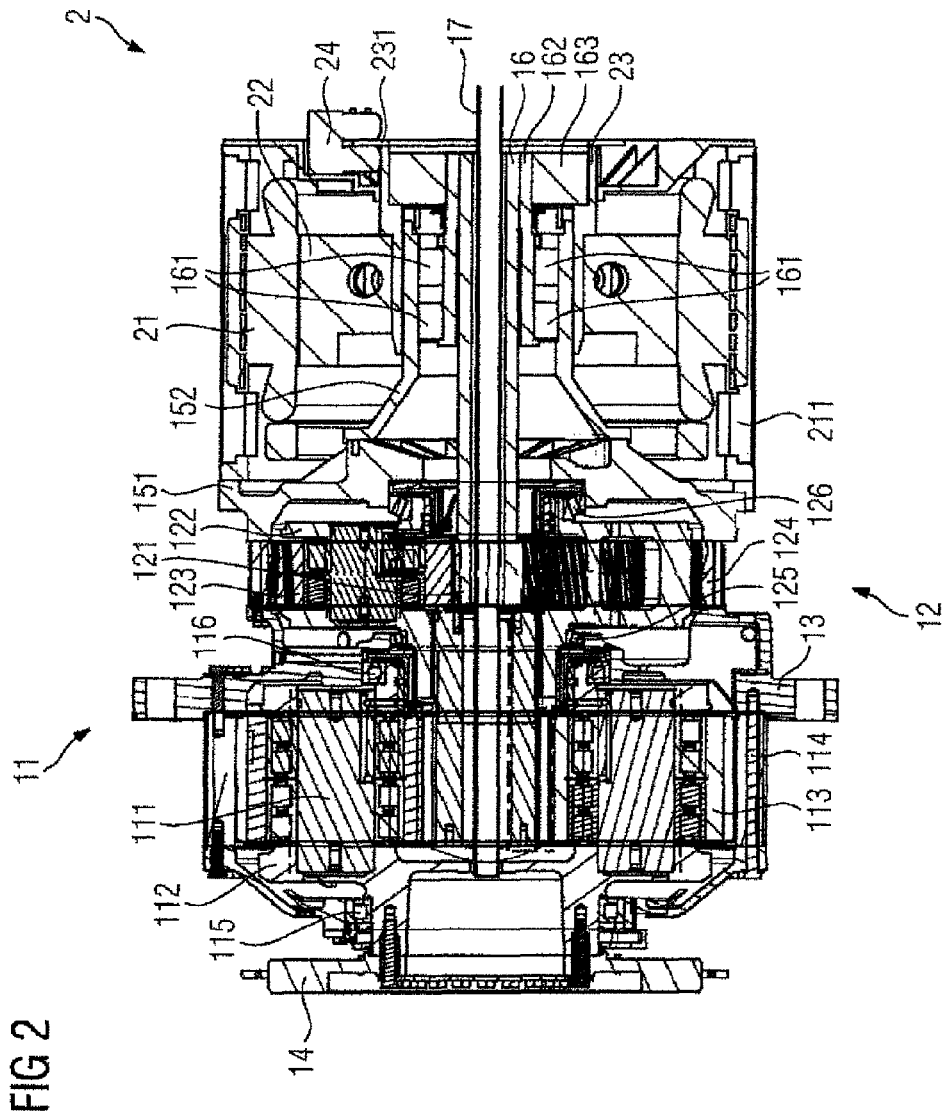
FIG. 2 shows a sectional view of the drive system illustrated in FIG. 1 with transmission and generator unit.

According to the sectional view shown in FIG. 2, approximately half of the output shaft 16 of the transmission unit 1 is axially enclosed by the hollow generator shaft 162. The bearing arrangement 161 of the output shaft 16 inside the hollow cylindrical extension of the housing support 152 preferably comprises a double-rowed bearing in an X arrangement. In addition, according to a particularly preferred embodiment variant, the hollow rotor shaft 23 and the output shaft 16 of the transmission unit 1 are mounted on the housing support 152 solely by means of the bearing arrangement 161. A rear hollow rotor shaft bearing on a front face of the generator unit 2 facing away from the transmission unit 1 can therefore be dispensed with.

In the present exemplary embodiment, a brake disk 231 is mounted on the hollow rotor shaft 23 in a rotatably fixed manner on the front face of the generator unit 2 facing away from the transmission unit 1. The brake disk 231 is thus easily accessible for maintenance purposes. A brake caliper 24 associated with the brake disk 233 is fixed to the housing cover arranged facing away from the transmission unit 1.

Figure 9:
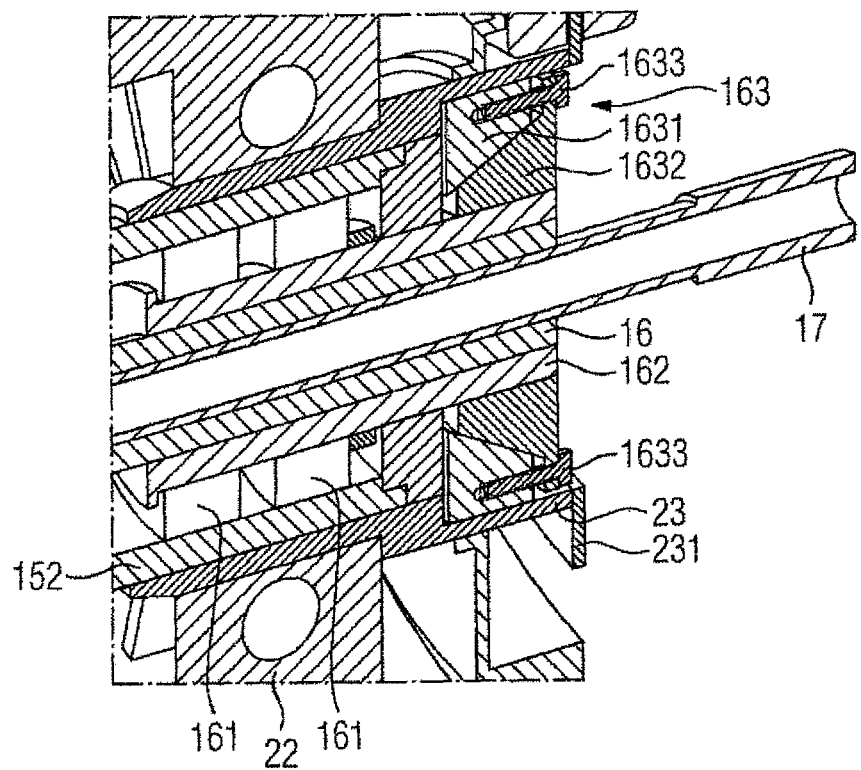
FIG. 9 shows another sectional view of the drive system illustrated in FIG. 1 with an internal clamping set.

The hollow gearbox shaft 162 can be connected to the output shaft 16 of the transmission unit 1 by means of a toothed coupling having involute splines or spiral toothing. Alternatively thereto, as illustrated in FIG. 9, the hollow gearbox shaft 162 can also be connected to the output shaft 16 of the transmission unit 1 by means of an internal clamping set 163. In this arrangement the internal clamping set 163 in each case comprises at least one outer ring 1631 and one inner ring 1632 which have conical contact surfaces corresponding to one another and can be interlocked with respect to one another by means of a plurality of axially extending clamping bolts 1633. By interlocking the at least one outer ring 1631 and the at least one inner ring 1632 it is possible, according to a preferred embodiment variant, to connect not only the output shaft 16 of the transmission unit 1 and the hollow gearbox shaft 162 but also the hollow gearbox shaft 162 and the hollow rotor shaft 23 to one another, by means of a force fit for example. The hollow gearbox shaft 162 can be expanded for example by an interlocking of the outer ring 1631 and inner ring 1632. This then leads to a force-fit connection between hollow gearbox shaft 162 and hollow rotor shaft 23. The hollow rotor shaft 23 can for example also be connected to the hollow gearbox shaft 162 by means of a keyed spline connection which is axially aligned onto the internal clamping set 163.

Alternatively to a toothed coupling or an internal clamping set, the hollow gearbox shaft 162 can be connected to the output shaft 16 of the transmission unit 1 by means of an external clamping set. When an external clamping set is used, a flange is advantageously provided at the generator-side end section of the output shaft 16 of the transmission unit 1. The rotor shaft 23 can also be connected to the hollow gearbox shaft 162 or output shaft 16 by way of the external clamping set.

In the present exemplary embodiment, the hollow cylindrical extension of the housing support 152 concentrically enclosing the bearing arrangement 161 of the output shaft 16 is integrally molded onto a housing intermediate flange 151 arranged between transmission unit 1 and generator unit 2. Both a stator housing 211 of the generator unit 2 and the ring gear 124 of the second planetary gear stage 12 are mounted on the housing intermediate flange 151. In addition, the housing intermediate flange 151 has a bearing seat for a generator-side planetary carrier bearing 126 of the second planetary gear stage 12.

According to FIG. 3, the housing intermediate flange 151 in each case has a flange extension 1511, 1512 on which the stator housing 211 or the ring gear 124 of the second planetary gear stage 12 is mounted. FIG. 4 shows a variant of a housing intermediate flange 151 in which the flange extension 1512 associated with the stator housing 211 and the flange extension 1511 associated with the ring gear 124 are axially spaced apart from one another.

The gearbox housing 15 has a fully cardanic circumferentially symmetric or partially symmetric suspension 13 for connecting to a supporting structural element of the wind turbine. Said supporting structural element is for example a frame or a nacelle of the wind turbine.

The second planetary gear stage 12 is dimensioned in terms of its transmission ratio such that when a number of generator poles divisible by 3 is chosen and given an optimally configured rated rotational speed, substantially identical external diameters of the stator of the generator unit 2 and the ring gear 124 of the second planetary gear stage 12 are produced. Bearings of the transmission unit 1 on the generator side are implemented as electrically insulating. A flow of current from the transmission unit 1 into a rotor of the generator unit 2 can accordingly be avoided.

By means of the fully cardanic suspension of the drive system in combination with an absence of transversal and radial forces and a two-point or torque mounting of the drive system there is produced a drive train which is henceforth subjected only to torsion. By combining transmission unit 1 and generator unit 2 on the housing side while taking advantage of their high rigidity, it is possible to achieve at least a significant reduction in reactive forces in the drive train despite significantly less rigid bearing elements in the cardanic suspension.

The combination of the two-point or torque mounting of the drive system with the fully cardanic suspension of the gearbox housing 15 which also encloses the generator unit 2 results in significantly less load being placed on a coupling arranged between transmission unit 1 and generator unit 2. A considerably stiffer implementation of said coupling is therefore possible. This in turn affords further advantages in respect of operating dynamics.

The main bearings of the transmission unit 1 can furthermore be embodied without taking into account bearings of downstream components. As a result it becomes possible to employ slewing ring bearings, which merely require a significantly smaller amount of installation space, for the main bearings of the transmission unit 1 in a technically manageable form for large drives. According to the invention, torsion-induced shaft alignment twisting has furthermore become irrelevant in respect of damage potential owing to the fully cardanic suspension for the transmission unit 1.

Figure 5:
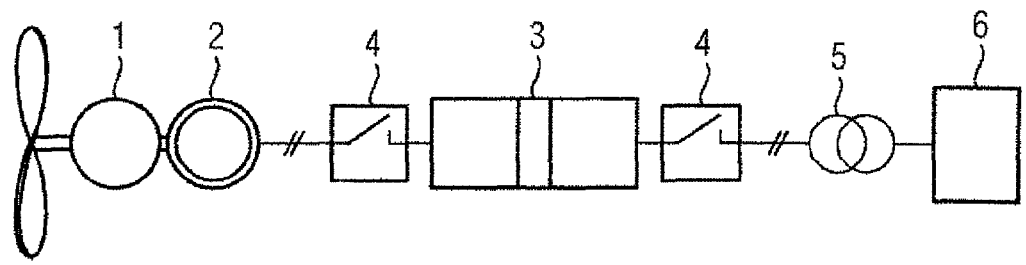
FIG. 5 shows a schematic view of a drive system for a wind turbine including connection to a power grid.

In the present exemplary embodiment, the generator unit 2 has three independent winding systems which are connected to a full power converter 3 shown in FIG. 5. The full power converter 3 enables grid-dynamic decoupling and is connected by way of load disconnecting switches 4 to the generator unit 2 on one side and to a transformer 5 on the other side for feeding power into a power supply grid 6. Insulated generator windings are additionally provided separately for each pole. Furthermore, the three independent winding systems are connected outside of the gearbox housing 15 enclosing the generator unit 2. The generator unit 2 is embodied as a 9- to 30-pole unit, preferably a 12- to 24-pole unit.

Figure 6:
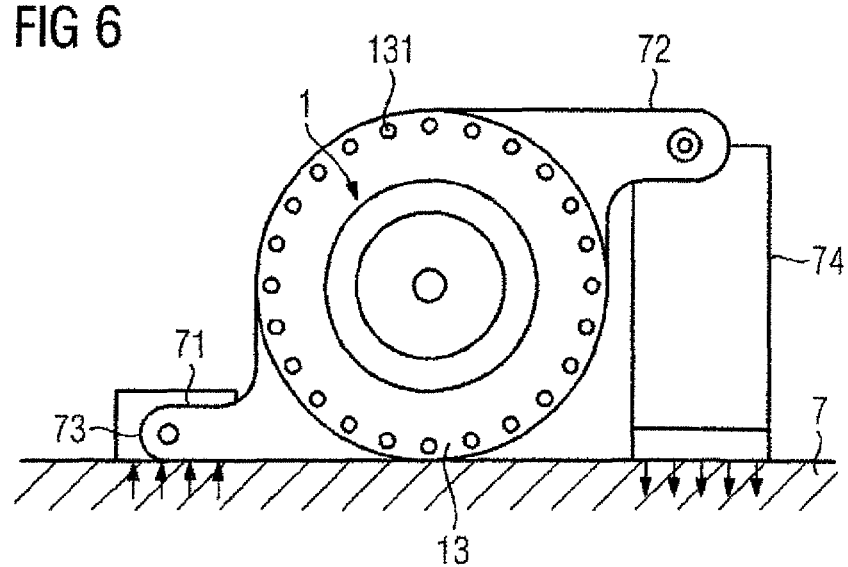
FIG. 6 shows a ring support for fully cardanic suspension of the drive system according to FIG. 1 with a corresponding two-arm torque support.

According to the exemplary embodiment shown in FIG. 6, the fully cardanic suspension 13 is formed by means of a ring support radially enclosing the gearbox housing 15 around its entire circumference. In the circumferential direction the ring support 13 has a plurality of substantially equidistantly arranged boreholes 131 into which elastic bolts are inserted by a first end section in each case. The elastic bolts are connected to a corresponding torque support on the supporting structural element 7 of the wind turbine. The corresponding torque support likewise comprises a ring element having substantially equidistantly arranged boreholes in the circumferential direction, into which boreholes the elastic bolts are inserted by a second end section. According to the exemplary embodiment illustrated in FIG. 6, the corresponding torque support additionally has two asymmetrically integrally molded-on support arms 71, 72 which are respectively inserted by an end section into a receptacle 73, 74 on the supporting structural element 7, where said support arms are connected to the structural element.

The elastic bolts of the fully cardanic suspension 13 are axially removable elastomer bolts. According to FIG. 1, the coupling flange 14 also has a plurality of substantially equidistantly arranged boreholes 141 in the circumferential direction, into which boreholes are inserted axially removable elastomer bolts which are connected to a corresponding rotor shaft coupling flange. When the elastomer bolts of the fully cardanic suspension 13 and of the coupling flange 14 are removed, a radial removal and/or installation direction of the drive system is enabled in respect of a shaft arrangement of the transmission unit 1.

Add-on assemblies of the transmission unit 1, for example oil system, cooler and hydraulics, are advantageously mounted directly on the supporting structural element 7 of the wind turbine. The add-on assemblies are accordingly decoupled from the gearbox housing 15 by means of the fully cardanic suspension 13 and a elastic coupling between rotor shaft and drive shaft of the transmission unit 1.

Figure 7:
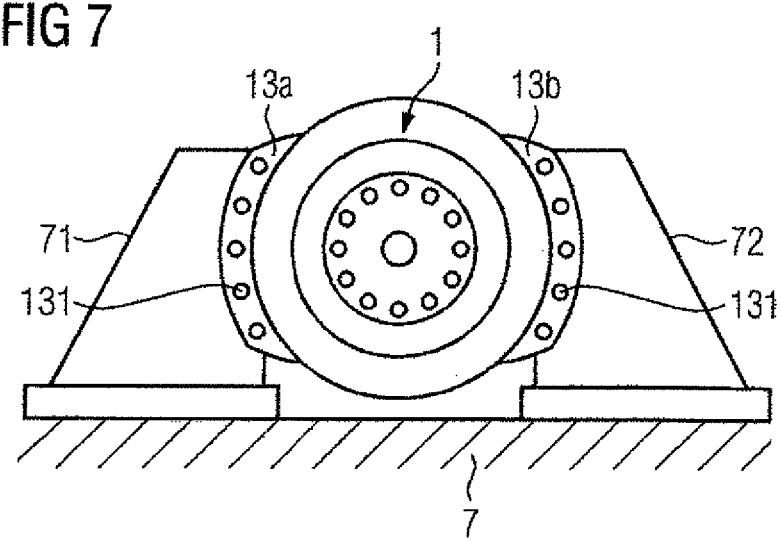
FIG. 7 shows two ring segment supports for fully cardanic suspension of the drive system according to FIG. 1 with corresponding torque supports.
Figure 8:
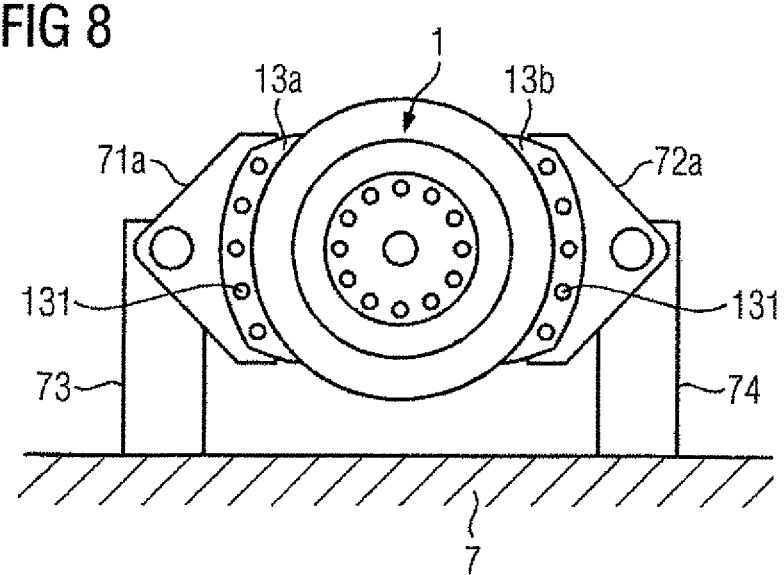
FIG. 8 shows two ring segment supports in a modified variant compared to FIG. 7.

FIGS. 7 and 8 each show two ring segment supports 13a, 13b for partially circumferential, fully cardanic suspension of the drive system. In the circumferential direction the ring segment supports 13a, 13b each have a plurality of substantially equidistantly arranged boreholes 131 into which elastic bolts are inserted. The elastic bolts are additionally connected to corresponding torque supports 71, 72 on the supporting structural element 7 of the wind turbine. According to the exemplary embodiment shown in FIG. 7, the corresponding torque supports 71, 72 are secured directly to the supporting structural element 7 of the wind turbine. In contrast, the corresponding torque supports according to the exemplary embodiment shown in FIG. 8 each comprise a support arm 71a, 72a, an end section of which is inserted into a receptacle 73, 74 on the supporting structural element, where said support arms are connected to the structural element. The ability to install said arms in the same way as a conventional two-arm support is accordingly retained without the necessity to modify the main frame on the wind turbine. Because an absence of reactive forces is already given, known elastomer bearings can be used which are preferably dimensioned fully in accordance with vibration-damping criteria.

Both in the exemplary embodiment shown in FIG. 7 and in the exemplary embodiment shown in FIG. 8, the corresponding torque supports on the supporting structural element 7 each comprise a ring segment having boreholes 131 arranged substantially equidistantly in the circumferential direction. The elastic bolts are inserted in said boreholes 131 and, just as in the case of the exemplary embodiment according to FIG. 6, can be embodied as axially removable elastomer bolts. The symmetry axis of the torque supports and the rotational axis of the drive system preferably intersect.

Furthermore, the coupling flange according to another embodiment variant can have a plurality of rows of boreholes which are offset relative to one another and into the boreholes of which axially removable elastomer bolts are inserted. As a result the coupling flange can be implemented in a smaller format in terms of its external diameter while having the same spacing between boreholes.

In addition, the elastomer bolts can have different stiffness ratings tailored according to diameter and type of flange. In particular, the coupling flange having a smaller diameter compared to the suspension can be made of a harder material, while the suspension can be manufactured from a softer material.

The use of the drive system described is not limited solely to wind turbines, but is also conceivable for example in mill drive systems, in which the generator unit is replaced by a motor unit.
may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A drive system for a wind turbine, comprising
   a transmission unit comprising at least one planetary gear stage which has a ring gear, a plurality of planetary gears, a planetary carrier and a sun gear,
   a first shaft which is associated with the transmission unit and has a coupling flange configured for connection to a work machine shaft or a rotor shaft, and which is supported by the planetary carrier,
   a gearbox housing enclosing the transmission unit as well as a motor or a generator unit, wherein the motor or generator unit is connected to a second shaft of the transmission unit,
   a rotor of the motor or generator unit which is connected in a rotatably fixed manner to the rotor shaft constructed as a hollow rotor shaft,
   a coupling or clamping connection arranged radially between the second shaft of the transmission unit and the hollow rotor shaft,
   a gearbox housing support arranged between transmission unit and the motor or generator unit and having a hollow cylindrical extension which concentrically encloses a motor-side or generator-side end section of the second shaft of the transmission unit and forms a bearing seat for a bearing arrangement radially disposed between the second shaft and the hollow cylindrical extension, wherein the rotor and the hollow rotor shaft concentrically enclose the hollow cylindrical extension, and
   at least one outer bearing element of the bearing arrangement which is connected to the hollow cylindrical extension, with the bearing arrangement supporting both the second shaft of the transmission unit and the hollow rotor shaft,
   wherein the first shaft of the transmission unit is a gearbox-side drive shaft and the second shaft of the transmission unit is a gearbox-side output shaft, with the coupling flange of the gearbox-side drive shaft being connected to the rotor shaft.

2. The drive system of claim 1, wherein motor-side or generator-side bearings of the bearing arrangement are constructed to be electrically insulating.

3. The drive system of claim 1, further comprising a brake disk connected to the hollow rotor shaft in a rotatably fixed manner.

4. The drive system of claim 3, wherein the brake disk is arranged on an end face of the motor or generator unit facing away from the transmission unit.

5. A drive system for a wind turbine, comprising
   a transmission unit comprising at least one planetary gear stage which has a ring gear, a plurality of planetary gears, a planetary carrier and a sun gear,
   a first shaft which is associated with the transmission unit and has a coupling flange configured for connection to a work machine shaft or a rotor shaft, and which is supported by the planetary carrier,
   a gearbox housing enclosing the transmission unit as well as a motor or a generator unit, wherein the motor or generator unit is connected to a second shaft of the transmission unit,
   a rotor of the motor or generator unit which is connected in a rotatably fixed manner to the rotor shaft constructed as a hollow rotor shaft, a coupling or clamping connection arranged radially between the second shaft of the transmission unit and the hollow rotor shaft, a gearbox housing support arranged between transmission unit and the motor or generator unit and having a hollow cylindrical extension which concentrically encloses a motor-side or generator-side end section of the second shaft of the transmission unit and forms a bearing seat for a bearing arrangement radially disposed between the second shaft and the hollow cylindrical extension, wherein the rotor and the hollow rotor shaft concentrically enclose the hollow cylindrical extension, at least one outer bearing element of the bearing arrangement which is connected to the hollow cylindrical extension, with the bearing arrangement supporting both the second shaft of the transmission unit and the hollow rotor shaft, and a hollow gearbox shaft concentrically enclosing the motor-side or generator-side end section of the second shaft of the transmission unit, wherein the hollow gearbox shaft is connected to the motor-side or generator-side end section in a rotatably fixed manner.

6. The drive system of claim 5, wherein the bearing arrangement comprises at least one inner bearing element which is connected to the second shaft or the hollow gearbox shaft.

7. The drive system of claim 5, wherein the hollow rotor shaft is connected to the second shaft of the transmission unit or to the hollow gearbox shaft by a toothed coupling having involute splines or spiral toothing.

8. The drive system of claim 5, wherein approximately half of the second shaft of the transmission unit is axially enclosed by the hollow gearbox shaft.

9. The drive system of claim 5, wherein the bearing arrangement disposed in the hollow cylindrical extension is axially aligned towards a center of the rotor of the motor or generator unit.

10. The drive system of claim 5, wherein the bearing arrangement disposed in the hollow cylindrical extension comprises a double-row bearing in an X-configuration.

11. The drive system of claim 5, wherein the hollow rotor shaft and the second shaft of the transmission unit are supported exclusively by the bearing arrangement disposed in the hollow cylindrical extension.

12. The drive system of claim 5, wherein the hollow rotor shaft is connected to the second shaft of the transmission unit or to the hollow gearbox shaft by means of an internal clamping set.

13. The drive system of claim 12, wherein the internal clamping set comprises at least an outer ring and an inner ring which have corresponding conical contact surfaces which can be tightened with respect to one another by axially extending clamping bolts.

14. The drive system of claim 5, wherein the coupling flange elastically connects the first shaft of the transmission unit to the work machine shaft or the rotor shaft, and wherein the gearbox housing comprises a circumferentially symmetric or partially symmetric cardanic suspension for connection to a supporting structural element of the wind turbine.

15. The drive system of claim 14, wherein the transmission unit comprises add-on assemblies which are mounted directly on the supporting structural element of the wind turbine and decoupled from the gearbox housing by the cardanic suspension as well as by elastic coupling between work machine shaft or rotor shaft and the first shaft of the transmission unit.

16. The drive system of claim 14, wherein the transmission unit comprises a first main bearing and a second main bearing arranged between planetary carrier sidewalls and the gearbox housing and supporting the first shaft of the transmission.

17. The drive system of claim 14, wherein the transmission unit comprises two coaxially arranged planetary gear stages.

18. The drive system of claim 14, wherein the cardanic suspension is formed by a ring support which radially encloses the gearbox housing around its entire circumference and has a plurality of circumferentially arranged and substantially equidistant boreholes, with elastic bolts configured for connection to a corresponding torque support on the supporting structural element of the wind turbine being inserted in the boreholes.

19. The drive system of claim 18, wherein the torque support comprises a ring element having circumferentially arranged and substantially equidistant boreholes matching the boreholes of the ring support.

20. The drive system of claim 19, wherein the torque support comprises two symmetrically or asymmetrically integrally formed support arms having end sections, with each end section configured for insertion into and connection to a corresponding receptacle disposed on the supporting structural element.

21. The drive system of claim 18, wherein the elastic bolts are axially removable elastomer bolts, and wherein the coupling flange has a plurality of circumferentially arranged and substantially equidistant boreholes configured to receive axially removable elastomer bolts for connection to a corresponding coupling flange of the work machine shaft or rotor shaft.

22. The drive system of claim 21, wherein when the elastomer bolts of the cardanic suspension and of the coupling flange are removed, a shaft arrangement of the transmission unit can be removed and/or installed in a radial direction of the drive system.

23. The drive system of claim 20, wherein the cardanic suspension is formed by two ring segment supports which radially and partially circumferentially enclose the gearbox housing, with each of the ring segment supports having a plurality of circumferentially arranged and substantially equidistant boreholes configured to receive elastic bolts for connection to corresponding torque supports on the supporting structural element of the wind turbine.

24. The drive system of claim 23, wherein each of the torque supports comprises a ring segment having circumferentially arranged and substantially equidistant boreholes configured to receive the elastic bolts.

25. The drive system of claim 24, wherein each of the torque supports comprises a support arm with end sections, wherein each end section is configured for insertion into a receptacle on the supporting structural element for connection to the supporting structural element.

26. A drive system for a wind turbine, comprising a transmission unit comprising at least one planetary gear stage which has a ring gear, a plurality of planetary gears, a planetary carrier and a sun gear, a first shaft which is associated with the transmission unit and has a coupling flange configured for connection to a work machine shaft or a rotor shaft, and which is supported by the planetary carrier, a gearbox housing enclosing the transmission unit as well as a motor or a generator unit, wherein the motor or generator unit is connected to a second shaft of the transmission unit, a rotor of the motor or generator unit which is connected in a rotatably fixed manner to the rotor shaft constructed as a hollow rotor shaft, a coupling or clamping connection arranged radially between the second shaft of the transmission unit and the hollow rotor shaft a gearbox housing support arranged between transmission unit and the motor or generator unit and having a hollow cylindrical extension which concentrically encloses a motor-side or generator-side end section of the second shaft of the transmission unit and forms a bearing seat for a bearing arrangement radially disposed between the second shaft and the hollow cylindrical extension, wherein the rotor and the hollow rotor shaft concentrically enclose the hollow cylindrical extension, at least one outer bearing element of the bearing arrangement which is connected to the hollow cylindrical extension, with the bearing arrangement supporting both the second shaft of the transmission unit and the hollow rotor shaft, and a housing intermediate flange arranged between transmission unit and the motor or generator unit, wherein the gearbox housing support is integrally formed on the housing intermediate flange.

27. The drive system of claim 26, wherein the housing intermediate flange comprises a bearing seat for the planetary carrier bearing.

28. The drive system of claim 26, wherein the ring gear is mounted on the housing intermediate flange.

29. The drive system of claim 26, wherein the motor or generator unit comprises a stator housing mounted on the housing intermediate flange.

30. The drive system of claim 29, wherein the housing intermediate flange comprises flange extensions, with the stator housing being mounted on a first flange extension and the ring gear being mounted on a second flange extension.

31. The drive system of claim 30, wherein the first flange extension and the second flange extension are axially spaced apart from each other.

* * * * *

UNITED STATES PATENT AND TRADEMARK OFFICE
CERTIFICATE OF CORRECTION

PATENT NO.        : 9,151,275 B2                                    Page 1 of 1
APPLICATION NO.   : 13/438487
DATED             : October 6, 2015
INVENTOR(S)       : Dinter et al.

It is certified that error appears in the above-identified patent and that said Letters Patent is hereby corrected as shown below:

On the title page item [56], "2011/1068645" should read --2011/0068645--.

Signed and Sealed this
First Day of March, 2016

Michelle K. Lee
*Director of the United States Patent and Trademark Office*